United States Patent [19]

Baldasarri

[11] 4,408,903
[45] Oct. 11, 1983

[54] METHOD OF AND APPARATUS FOR RADIATION PYROMETRIC TEMPERATURE MEASUREMENT OF A CONTINUOUS CAST METAL BAR

[75] Inventor: Giuseppe Baldasarri, Carrollton, Ga.

[73] Assignee: Southwire Company, Ga.

[21] Appl. No.: 248,155

[22] Filed: Mar. 30, 1981

[51] Int. Cl.³ .............................................. G01J 5/02
[52] U.S. Cl. .................................. 374/121; 29/527.7;
72/13; 164/76.1; 164/413; 164/417; 164/454;
374/126
[58] Field of Search ........ 73/355 EM, 355 R, 15 FD;
250/338, 340, 359; 356/43; 374/5, 121, 126;
164/454, 76.1, 413, 417; 29/527.7; 72/13

[56] References Cited

U.S. PATENT DOCUMENTS

| | | | |
|---|---|---|---|
| 2,846,882 | 8/1958 | Gray | 73/355 EM |
| 3,020,745 | 2/1962 | Sielicki | 73/15 FD |
| 3,314,293 | 4/1967 | Schraeder | 73/355 EM |
| 3,504,524 | 4/1970 | Maley | 73/15 FD |
| 4,037,473 | 7/1977 | Compton et al. | 73/355 R |

Primary Examiner—James J. Gill
Attorney, Agent, or Firm—Herbert M. Hanegan; Stanley L. Tate; Robert S. Linne

[57] ABSTRACT

Disclosed are a method of and apparatus for radiation pyrometric temperature measurement of a continuous cast metal bar. Cast bar advancing from a continuous casting machine is continuously monitored for temperature without contacting the cast bar with any apparatus by applying a layer of soot onto the surface of the bar, detecting infrared radiation emitted from the sooted area, converting the detected radiation into a temperature signal, displaying the temperature, and completely removing the soot from the cast bar before it enters a rolling mill.

26 Claims, 4 Drawing Figures

METHOD OF AND APPARATUS FOR RADIATION PYROMETRIC TEMPERATURE MEASUREMENT OF A CONTINUOUS CAST METAL BAR

BACKGROUND OF THE INVENTION

This invention relates generally to a method of and apparatus for determining the temperature and other thermodymanic characteristics of an object, and particularly relates to a method of and apparatus for measuring the temperature of a highly reflective moving object.

In the prior art various types of temperature measuring apparatus are known, for example, a color pyrometer which is a device designated to measure the temperature of an object by determining the intensity of its radiation at two different wave length regions. Such a two-color pyrometer is quite satisfactory for determining the temperature of an object provided the object is a black or so called gray body. A gray body as used here is defined as having a radiation intensity over different wave lengths which generally follows Plank's laws except that the intensity of its radiation is less by a fixed amount than the radiation of a black body. However, if the object is not a black body or is a non-gray body and therefore has a radiation intensity distribution over different wavelengths which does not follow Plank's laws, a two-color pyrometer will not, in general, indicate the true temperature of the object.

Another type device used to measure the temperature of an object is a total radiation pyrometer. As the name implies this device measures the total radiation emitted by an object. Conventionally, a total radiation pyrometer makes use of a black body which is used as a reference body. In one type of total radiation pyrometer the reference body is held at a fixed temperature and the radiation intensity of the reference body and that of the object being measured are compared after taking into account any differences in the distances between the reference body and its detector and the object and its detector. Again, the object is assumed to have a radiation distribution of either a black body or a gray body.

Another type of total radiation pyrometer has been devised to overcome the disadvantages of the two devices previously discussed. This is also a total radiation pyrometer but has been adapted so that the reference body and an opaque object are positioned in close proximity. As a result, when the temperature of the object and the black body are the same the body is in a substantially isothermal enclosure, i.e. the object is essentially in a black body environment. This construction is advantageous because it ensures that Kirchoff's law is obeyed by the radiation emitted and reflected by the object. When the reference body is not at the same temperature as the object, the sum of the energies emitted and reflected by the object are not numerically equal to that from the black body at the same temperature which is positioned in place of the object.

The radiation emitted by the black body is measured by a first detector and a second detector measures the radiation emitted by the object as well as the radiation of the black body reflected by the object together. It is essential for the operation of such a pyrometer that a black body environment be provided for the object which means that the black body must be in close proximity to the object. Under certain conditions this constraint cannot be met, for example, if the object, the temperature of which is being measured, is located in an induction furnace, it may be impossible to position the black body also in the induction furnace without disturbing the electric field created in the induction furnace and without adversely affecting the operation of the black body. Also, there are definite limits which define the geometric relationship between the object, the black body and the respective detectors. In such a total radiation pyrometer the black body must be of a relatively large size and therefore has considerable thermal lag.

Another apparatus for measuring temperature at the surface of an object using infrared radiation is described in U.S. Pat. No. 3,924,469 which discloses an apparatus comprising a variably heated metallic body which serves as a compensating radiator, a reflective member mounted on a shaft within a cavity provided within the compensating radiator body for rotation, or alternatively oscillation, about an axis forming an oblique angle to the plane of the reflective member such that in one position of the reflective member only infrared radiation from the surface of the object is reflected by it into a radiation detector, while in another position of the reflective member only infrared radiation from a wall surface of the cavity within the compensating radiator is reflected by it into the radiation detector whereby infrared radiation from the object and compensating radiator are admitted to the radiation detector in alternation. The detector then produces an alternating current signal determined by any temperature differential existing between the object and the heat supply to the compensating radiator is varied in accordance with the signal in such sense as to reduce the signal to zero whereby the temperature of the compensating radiator then equals the temperature of the object.

With the exception of attaching dyestuff, dielectric media and other foreign substances to the object and observing their temperature related characteristics from a distance, no practical radiation pyrometry methods of measuring the temperature of an object without physical contact exist. Radiation pyrometry methods have in the past been of limited usefulness because both the radiation being emitted by the object and the radiation being reflected by it influence the value obtained by such methods. In order to ensure precise temperature measurements by use of radiation pyrometry methods it is important to reduce the radiation from extraneous sources which is reflected from the object and extracted by a sensor. Additional radiation pyrometry methods are disclosed in U.S. Pat. Nos. 3,057,200; 3,364,066; 3,413,474; 3,462,602; 3,073,122; 4,172,383; 4,233,512 and general radiation theory is also discussed in standard texts for the study of physics, however, it is not felt that these references are particularly relevant to the invention disclosed and claimed herein.

In the art of continuous casting and rolling of aluminum the difficulties in continuously measuring the temperature of the cast bar between the casting machine and the rolling mill are compounded by the reflective and emissivity characteristics of the cast alulminum bar. The radiative surface properties of a cast aluminum bar are a function of the surface quality and alloy composition surface properties can also be functions of the solidification process itself, for example, inverse segregation will significantly alter the surface characteristics of a cast bar. Also, the amount of thermal radiative energy from the cast bar which reaches an infrared sensor is affected by the intervening atmosphere which absorbs, reflects, scatters and re-emits radiative energy, as well as the geometry of the sensor location relative to the cast bar. The problem of accurately measuring the cast bar temperature of an aluminum cast bar by infrared radiation pyrometry is made even more complex because of the temperature range being measured and because aluminum characteristically has a low and extremely variable (0.02 to 0.6) emissivity and the combination of these factors create problems in discriminating between the signal from the cast bar and extraneous signals from the surroundings.

The exact composition of an aluminum cast bar depends upon the alloy specified by a customer and by specified physical properties which are desired for a finished product to be produced from the bar being cast. All such variations are reflected in changes in both the optical and thermal radiative properties of the bar surface. Also, the amount of surface oxidation, surface scale and other surface characteristics are variable from one alloy to another. Additionally the surface characteristics and indirectly the thermal radiative properties of the cast bar can be changed by variations in process parameters.

SUMMARY OF THE INVENTION

Briefly described, the present invention comprises a method of and apparatus for continuously measuring the temperature of moving and reflective substrate without the necessity of the temperature sensor coming into direct physical contact with the moving substrate. The moving substrate (for example cast metal bar and billet) emerging from a casting machine is passed through an apparatus adapted to apply a uniform layer of soot to the bar surface, detect infrared radiation being emitted from the blackened area of the cast bar and convert the detected radiation into an electrical temperature signal which is displayed in meaningful fashion, and completely remove the soot from the surface of the cast bar before the cast bar enters a rolling mill which then rolls the cast bar into a rod.

It is therefore an object of this invention to overcome the disadvantages setforth above.

It is another object of this invention to make it possible to accurately measure the temperature of a moving reflective material without physically contacting the moving material with the measuring device.

Another object of this invention is to provide a method of and apparatus for making an accurate emissivity based temperature measurement of a moving highly reflective substrate.

It is another object of this invention to provide a method of and apparatus for measuring the temperature of a moving reflective substrate which negates the influence of substrate surface properties upon the optical and thermal radiative properties of the substrate.

It is still another object of the present invention to provide a method of and apparatus for continuously measuring the temperature of a moving reflective substrate which is not influenced by the composition of the alloy which makes up the substrate.

Yet another object of the present invention is to provide a method of and apparatus for continuously measuring the temperature of a moving reflective substrate which eliminates the problem of discriminating between the signal from the substrate and extraneous signals from the surroundings.

A further object of the present invention is to provide a radiation pyrometric method for measuring the temperature of a moving substrate which is unaffected by reflected radiation.

These and other objects, features and advantages inherent in the present invention will become apparent from the accompanying drawings and the following detailed description thereof wherein like numerals indicate like parts throughout the several views.

DESCRIPTION OF THE PREFERRED EMBODIMENT

Figure 1:
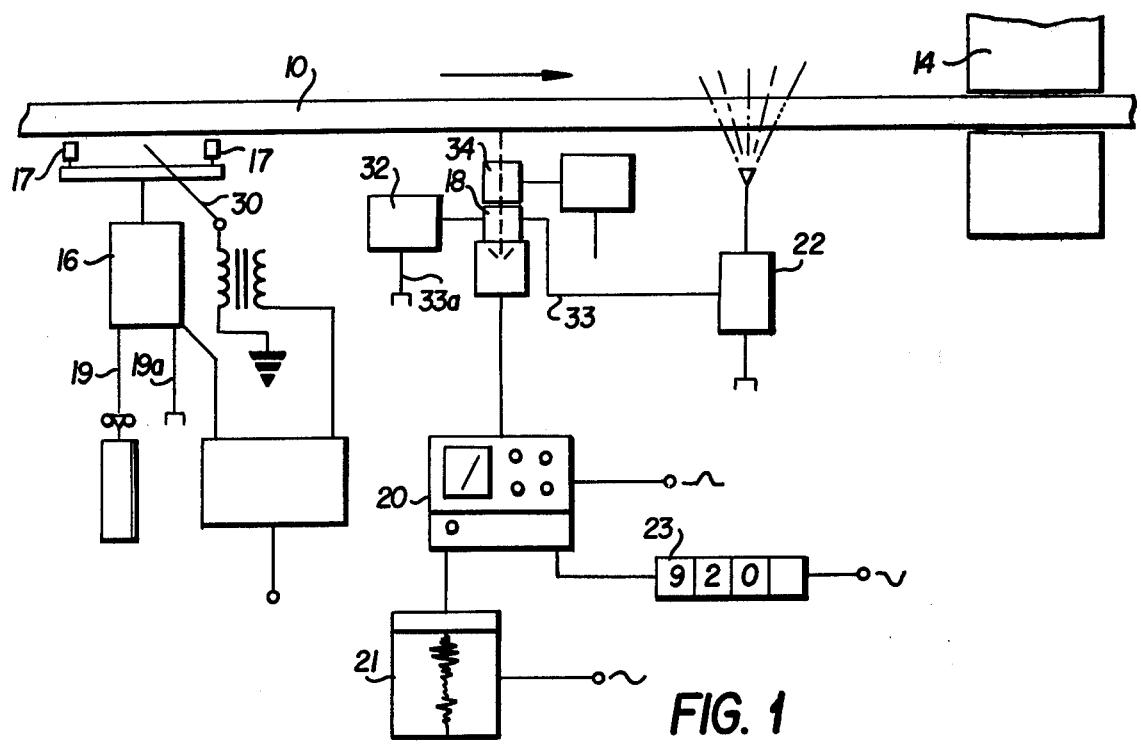
FIG. 1 is a diagramatic representation of the temperature measuring device of the present invention.

Referring now more particularly to the drawings, FIG. 1 shows a cast bar 10 advancing from a casting machine (not shown) toward a rolling mill 14. A cast bar 10 advances toward mill 14 it passes through sooter 16 which burns acetylene to form a uniform layer of soot which deposits on the surface of cast bar 10. After soot is uniformly applied to its surface, cast bar 10 continues to advance toward mill 14 and passes infrared radiation sensor 18 where infrared radiation which is emitted from bar 10 is detected. The detected infrared radiation is converted into an electrical signal in sensor 18, simplified by amplifier 20 and transmitted to recorder 21, digital display 23 or other remote instruments not shown where it is displayed in a useful fashion or used as control input data. Cast bar 10 continues to advance and passes atomizer 22 where the soot coating is removed by means of a fine water spray or water oil emulsion spray directed against bar 10 by atomizer 22 which causes the carbon to fall from the cast bar 10.

Figure 2:
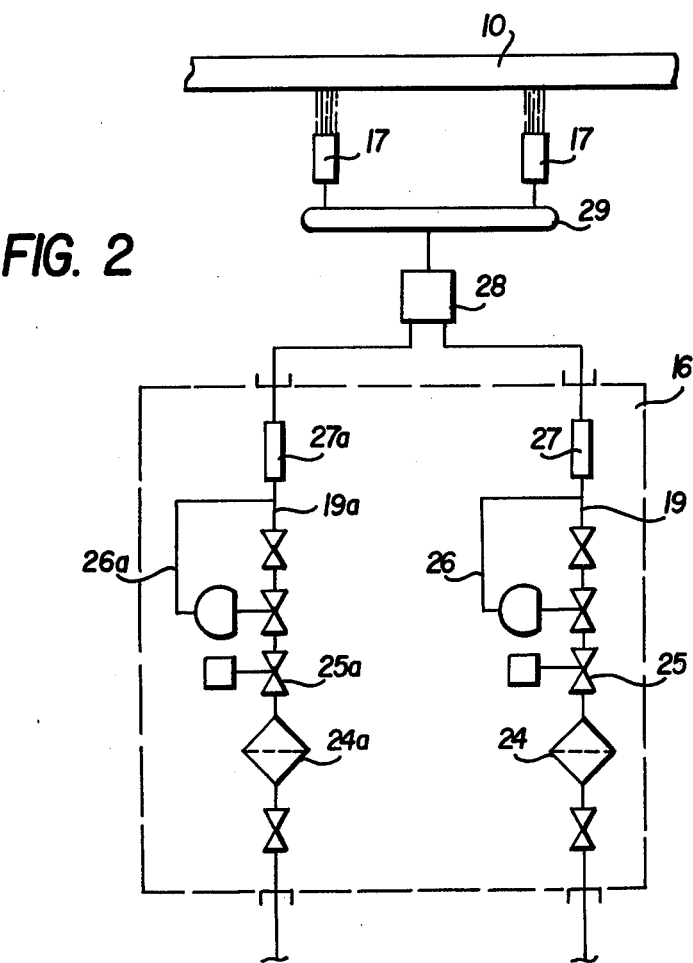
FIG. 2 is a diagramatic representation of the automatic sooter which makes up a part of the temperature measuring device of the present invention.
Figure 3:
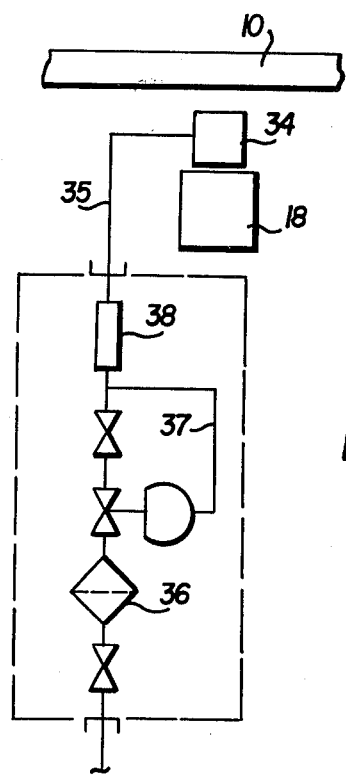
FIG. 3 is a diagramatic representation of the lens purging apparatus which makes up a part of the temperature measuring device of the present invention.

Automatic sooter 16 is illustrated in more detail in FIG. 2. The acetylene supply means 19 which supplies acetylene to sooting tips 17 is adapted to provide a constant flow of acetylene regardless of the pressure of the acetylene source. This is accomplished by first flowing the acetylene through acetylene filter 24 where gas borne solid impurities are removed. After exiting the filter 24 the acetylene passes through a solenoid valve 25 which is adapted to receive remote signals capable of interrupting or starting the flow of acetylene through the system. From solenoid valve 25 the acetylene passes to flow control valve 26 where the flow rate of the acetylene is adjusted to a constant rate which is thereafter independant of the upstream pressure of the general source of acetylene supply. The acetylene then flows from the flow control valve 26 to flow meter 27 and thence to mixer 28 where it is mixed with air before being conveyed to manifold 20 to which sooting tips 17 are attached. The air which is mixed with the acetylene in mixer 28 follows a similar and parallel path from the general air supply to mixer 28. Air flows through air supply means 19 to filter 24a which removes any air borne particulate contaminants. After passing through air filter 24a the air then passes through solenoid valve 25a which is adapted to receive remote source signals capable of interrupting or starting the flow of air through the system. From solenoid valve 25a the air then passes to flow control valve 26a where the flow rate is adjusted to a constant rate which is independant of the pressure of the general source of air supply. Air then flows from flow control valve 26a through flow meter 27a to mixer 28 where it is mixed with the acetylene and the air acetylene mixture is then transported to manifold 29 for subsequent soot production at sooting tips 17. Ignition of the air acetylene mixture flowing from sooting tips 17 is accomplished by positioning an electric igniter 30 in the stream of air fuel mixture flowing from tips 17. The electric igniter ignites the acetylene-air mixture and the mixture of acetylene and air is regulated to burn in such a way to promote soot formation so that a layer of soot will be deposited by convection and system pressure on cast bar 10 as it advances past and through the burning air-acetylene mixture. An electric igniter of the glow-plug type has been used with best results but both a spark plug type igniter or pilot flame could also be used successfully. Carbon could also be applied as a spray or by electrostatic deposition methods but such methods are temperature dependent and must be closely controlled. Soot applied using the automatic sooter 16 can be applied in varied thicknesses and with proper acetylene and air flow rates (for example 12 cubic feet per minute acetylene and 20 cubic feet per minute air) essentially no free atmospheric soot is experienced when tips 17 are of the Horns H-1 type and are positioned approximately three to four inches from the cast bar. At such use levels, approximately 7 to 8 pounds of soot would be deposited on the substrate in a five day, 24 hour per day work week if the equipment were operating at eighty percent efficiency. In the operation of the automatic sooter 16 an air supply of from 20 to 200 psi (2 to 5 scfh) is required and an acetylene supply of a maximum 15 psi at 5 to 20 scfh per hour is required.

Cast bar 10 which has been blackened with soot produced by automatic sooter 16 advances past infrared sensor 18. Because the cast bar 10 has been blackened, the emissivity of the bar passing sensor 18 becomes the emissivity of the carbon coating (from about 0.78 to about 0.80 in the temperature range of from room temperature to 1000° F.) instead of the highly variable emissivity of an uncoated aluminum cast bar. Therefore, accurate bar temperature measurements can be made with very little variation (K 3° F. within the separational temperature range).

When the cast bar 10 is coated with soot the radiative surface properties of the bar are made substantially constant and because the black surface will absorb and not reflect radiative energy from other sources, the radiation detected relates to the absolute temperature of the emitting object (cast bar 10) and therefore such detected radiation can be used to monitor the temperature of the emitting object.

Because the ambient temperature in the vicinity of a continuous casting and rolling line can reach temperatures in excess of 100° F. cooler 32 is used to cool sensor 18. This cooling is accomplished by using a water system the used water from which is routed to atomizer 22 via water delivery means 33 for spraying thereof onto the cast bar 10. Cooling water is supplied to cooler 32 via water supply means 33a with the motive force necessary to move the water being supplied by the flow of air through atomizer 22 which is of the Venturi type. Lens 34 of sensor 18 is kept free of dust and other particulate matter which might interfere with reception of infrared radiation from cast bar 10 by continuously purging the lens 34 and lens area with either air, nitrogen, helium or mixtures thereof which is delivered to the lens through purging gas purge line 35. Purging gas entering purge line 25 from the source of purging gas (not shown) passes through filter 36 which houses a filter element fine enough to remove any harmful particulate contaminants which might be in the unfiltered purging gas. After passing through filter 36 the purging gas passes through flow control unit 37 so that a constant flow of purging gas to lens 34 is assured without regard to intermittent increases or decreases in the pressure of the purging gas. A flow meter 38 is also provided downstream of flow control unit 37 so that the operator may select the desired flow rate of the purging gas being supplied to lens 34 through purging line 35. This introduction of a purging gas into lens 34 creates a positive pressure within the lens body thereby preventing carbon particles or other particulate contaminants from entering the lens and interfering with the accurate sensing of radiant energy from cast bar 20.

While it is necessary to apply the soot to the surface of cast bar 10 to accurately measure the radiant energy being emitted by the bar, it is equally as necessary to completely remove all of the soot from bar 10 before the bar enters rolling mill 14. If the soot is not removed, the carbon particles will be removed from the surface of rod by the rolling lubricant and will soon so alter the lubricating properties of the rolling lubricant that production will have to be curtailed or stopped altogether while contaminated rolling lubricant is replaced with fresh lubricant. In order to avoid such an occurance, the apparatus of the present invention has had included in it a device designed to completely remove the soot from the surface of bar 10 before the bar enters rolling mill 14.

Figure 4:
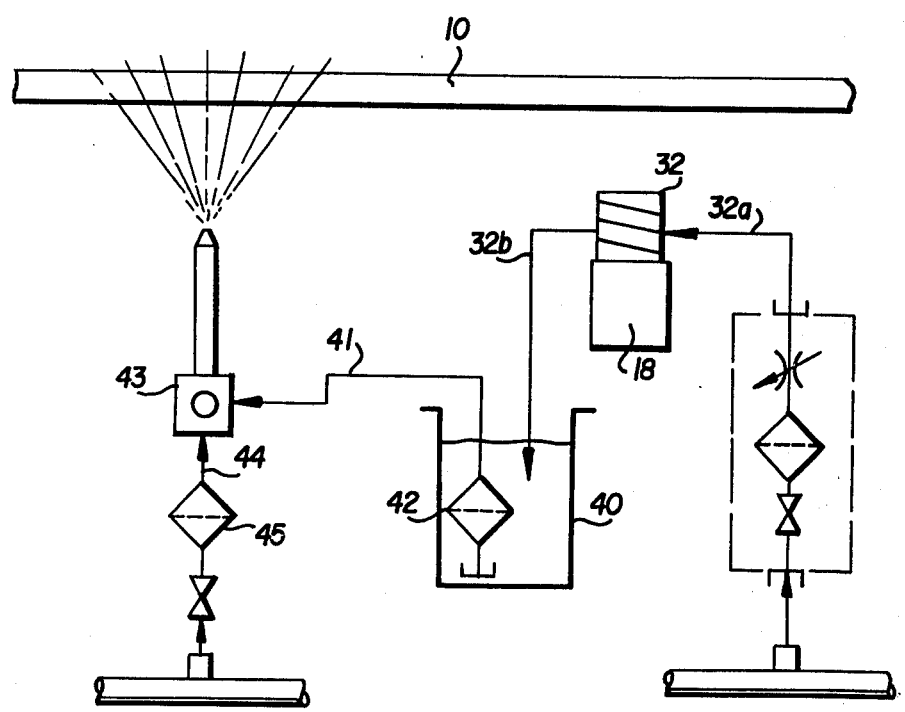
FIG. 4 is a diagramatic representation of the soot removal and sensor cooling portions of the temperature measuring device of the present invention.

Referring to FIG. 4 for a more detailed view of this device, it can be seen that cooler 32 which maintains the temperature of sensor 18 within the optional operating range for infrared radiation sensors is adapted to allow the cooling water which enters from coolant supply line 32a to drain from the sensor area through drain line 32b. Cooling water thus removed from sensor 18 is accumulated in reservoir 40 and as needed withdrawn from reservoir 40 through atomizer supply line 41 by the flow of air through Venturi type atomizer 43. Water being withdrawn from reservoir 40 is filtered through submerged filter 42 as it enters supply line 41. This filtered water is then conveyed to atomizer 43 where it is applied to the soot bearing surface of cast bar 10 in quantities sufficient to remove all residual soot from the surface of bar 10. Usually no more than about one-half to one liter of water per hour is required to completely remove all residual soot from the bar surface depending on production rate and size of bar. A soluble oil and water emulsion may be used to remove the soot from bar 10 with equal success. Atomizer 43 requires air to draw water from reservoir 40 and propel the water droplets onto the cast bar 10, this air is supplied to atomizer 43 through air line 44. Air entering atomizer 43 through line 44 is filtered through filter 45 before entering the atomizer 43 to prevent blockages caused by particulate contaminants borne by the unfiltered air. Soot may also be removed from bar 10 by using a torch (not shown) and a very lean oxidizing flame which completes combustion of the soot. In any event, it is necessary to carefully remove the soot from bar 10 to prevent the harmful effects described above and to avoid significantly altering the temperature of bar 10 before it enters the rolling mill 14 because, an increase or decrease from optimum rolling temperature can significantly harm the physical and electrical properties of the rod being rolled from cast bar 10.

To demonstrate the effect of reflected radiant energy upon the temperature of a cast aluminum alloy bar, soot was applied to a cast bar which had implanted in it a type "K" thermocouple. The temperature of the soot covered area of the cast bar was determined to be approximately 800° F. when the temperature of the bar was measured by the infrared radiation technique of the present invention and the temperature of the cast bar as measured by the type "K" thermocouple was also measured as approximately 800° F. while the temperature measured by an infrared sensor focused on an area of the bar having no soot covering was lower than 500° F. Additionally experiments also demonstrated that within reasonable limits, the thickness of the soot layer covering the bar has no appreciable effect on the accuracy of the measurements made by the method and apparatus of the present invention so long as the bar surface is completely covered.

This invention has hereinbefore been described in terms of one preferred embodiment but it is understood that variations and modifications can be effected within the spirit and scope of the invention as described and as defined in the appended claims.

I claim:

1. In a method for continuous casting and rolling of a metal bar into rod including the steps of casting molten metal into a metal bar in a casting machine, conveying the cast metal bar to a rolling mill and rolling said cast bar into a rod the improvement comprising, continuously measuring the temperature of said cast bar as said cast bar moves between said casting machine and said rolling mill said continuous temperature measurement comprising the steps of:
    (a) providing a constant flow of acetylene from an acetylene source;
    (b) flowing said acetylene through an acetylene filter;
    (c) passing said filtered acetylene through an acetylene solenoid value adapted to receive remote signals capable of interrupting or starting flow of acetylene;
    (d) flowing said acetylene through an acetylene flow control valve adapted to adjust acetylene flow to a rate which is independent of the pressure of the acetylene source;
    (e) passing said acetylene through an acetylene flow meter;
    (f) providing a constant flow of air;
    (g) flowing said air through an air filter;
    (h) passing said filtered air through an air solenoid valve adapted to receive remote signals capable of interrupting or starting flow of air;
    (i) flowing said air through an air flow control valve adapted to adjust air flow to a rate which is independent of pressure up stream of said control valve;
    (j) passing said air through an air flow meter;
    (k) mixing said acetylene and said air into an acetylene air mixture;
    (l) flowing said mixture through a manifold to sooting tips adjacent to the path of said cast bar;
    (m) igniting and burning said mixture in a controlled manner whereby a uniform layer of soot is deposited on the surface of said cast bar to form an area of controlled emissivity;
    (n) continuously detecting infrared radiation emitted from said area of controlled emissivity;
    (o) continuously converting said detected radiation into an electrical signal representative of the temperature of said cast bar; and
    (p) continuously removing said soot from the surface of said cast bar before said cast bar enters said rolling mill.

2. The method of claim 1 wherein step (k) further comprises mixing about twelve cubic feet of acetylene with about twenty cubic feet of air per minute.

3. The method of claim 1 wherein said acetylene is provided at a maximum pressure of about fifteen psi and at from about five to about twenty scfh per hour.

4. The method of claim 1 wherein said air is provided at a pressure from about twenty to about two hundred psi and at from about 2 to about 5 scfh per hour.

5. The method of claim 1 wherein the step of converting detected radiation into a temperature signal further comprises: converting detected infrared radiation into an electric signal; amplifying said signal in amplifier means; and transmitting said amplified signal to recorder means.

6. The method of claim 1 wherein said step of continuously converting said detected radiation into an electrical signal representative of the temperature of said cast bar further comprises displaying said electrical signal on a digital display or using said signal as control input data.

7. The method of claim 1 wherein said step of continuously removing said soot from the surface of said cast bar before said cast bar enters said rolling mill further comprises spraying atomized water onto said bar after detecting infrared radiation emitted from said area of controlled emissivity and before passing said cast bar to said rolling mill.

8. The method of claim 7 further comprising the steps of:
    (a) filtering said water to remove contaminants;
    (b) supplying said water to a Venturi atomizer by flowing filtered air through said atomizer; and
    (c) propelling said atomized droplets of water and said air onto the soot bearing surface of said bar in quantities sufficient to remove all soot therefrom.

9. The method of claim 8 wherein the quantity of water applied is from about one half to about one liter per hour.

10. The method of claim 1 wherein said step of continuously removing said soot from the surface of said cast bar comprises applying a lean oxidizing flame to the soot bearing surface of said cast bar whereby combustion of said soot takes place thereby removing the same from the surface of said cast bar.

11. In an apparatus for the continuous casting and rolling of metal bar into rod including a casting machine for casting molten metal into a cast bar, means for conveying the cast bar to a rolling mill and a rolling mill for rolling said cast bar into a rod the improvement comprising apparatus for continuously measuring the temperature of said cast bar without physically contacting said cast bar as said cast bar moves between said casting machine and said rolling mill, said temperature measuring apparatus comprising in combination;
    (a) means for providing a constant flow of acetylene from an acetylene source to a means for mixing acetylene and air to form a fuel mixture which upon ignition burns and deposits a uniform layer of soot upon the surface the moving cast bar;

(b) filter means positioned between said acetylene source and said means for mixing acetylene and air to filter particular contaminants from said acetylene;

(c) means for passing said filtered acetylene through an acetylene solenoid valve located between said filter means and said mixing means said means being adapted to receive remote signals capable of interrupting or starting the flow of acetylene to said mixing means;

(d) means located between said acetylene solenoid valve and said mixing means for flowing said acetylene through an acetylene flow control valve adapted to adjust acetylene flow to a rate which is independent of the pressure of the acetylene source;

(e) means located between said flow control valve and said mixing means for measuring the flow rate of acetylene flowing into said mixing means;

(f) means for providing a constant flow of air from an air source to said mixing means;

(g) filter means positioned between said air source and said mixing means to filter particulate contaminants from said air;

(h) means for passing said filtered air through an air solenoid valve located between said filter means and said mixing means said means being adapted to receive remote signals capable of interrupting or starting the flow of air to said mixing means;

(i) means for flowing said air through an air flow control valve adapted to adjust air flow to a rate which is independent of pressure upstream of said control valve;

(j) means located between said air flow control valve and said mixing means for measuring the flow rate of air flowing into said mixing means;

(k) manifold means for flowing a measured amount of said fuel mixture to and out of sooting tips for ignition and burning in a controlled manner;

(l) means adjacent to said sooting tips for igniting said mixture as said mixture exits said sooting tips whereby a controlled flame is created and the fuel mixture is oxidized at a controlled uniform rate to produce a uniform layer of soot in the surface of said moving cast bar as said cast bar passes in close proximity to said flame thereby creating an area of controlled emissivity on the surface of said cast bar;

(m) means for detecting infrared radiation emitted from said area of controlled emissivity;

(n) means for converting aid detected radiation into a signal representative of the temperature of said cast bar; and, (o) means for treating the surface of said cast bar whereby said area of controlled emissivity is eliminated therefrom before said cast bar enters said rolling mill.

12. The apparatus of claim 11 wherein the maximum pressure of acetylene is about fifteen psi at a flow rate of from above five to about 20 scfh per hour.

13. The apparatus of claim 12 wherein said air is provided at a pressure from about twenty to about two hundred psi and at a flow rate of from about two to about 5 scfh per hour.

14. The apparatus of claim 11 further comprising cooling means capable of maintaining said means for detecting infrared radiation at a temperature below 120° F.

15. The apparatus of claim 14 wherein said cooling means uses water as a coolant.

16. The apparatus of claim 13 wherein said cooling means comprises water circulating means adapted to circulate water about said means for detecting infrared radiation at a rate sufficient to maintain said means for detecting infrared radiation at a temperature below 120° F.

17. The apparatus of claim 11 further comprising purging means for continuously flushing dust, soot and other particulate matter which could impair the ability of said means for detecting infrared radiation to detect and differentiate infrared radiation emitted from the soot darkened area of said cast bar from extraneous infrared radiation emitted from adjacent bodies.

18. The apparatus of claim 17 wherein said gas is selected from a group consisting of air, nitrogen, helium and mixtures thereof.

19. The apparatus of claim 11 wherein said means for detecting infrared radiation includes a lens for collecting, concentrating and focusing said infrared radiation.

20. The apparatus of claim 19 wherein said purging means for continuously purging said means for detecting infrared radiation comprises means for creating a positive pressure within the lens of said means for detecting infrared radiation which positive pressure causes particulates to be purged from said lens and prevents entry of additional particulate matter into said lens.

21. The apparatus of claim 20 further comprising means for continuously filtering said gas before said gas is used to purge said sensor lens.

22. The apparatus of claim 11 wherein said means for detecting infrared radiation emitted from said area of controlled emissivity comprises in combination:
means for converting detected infrared emission into an electric signal;
amplifier means for amplifying said signal; and
means for transmitting said amplified signal to recorder means.

23. The apparatus of claim 11 wherein said means for converting detected infrared radiation into a signal representative of the temperature of said cast bar includes a digital display or means for using said signal as control input data.

24. The apparatus of claim 11 wherein means further comprises means for spraying atomized water onto said bar after said bar passes said means for detecting infrared radiation and before said bar enters said rolling mill.

25. The apparatus of claim 24 further including means for diverting used cooling water from the cooling means to said means for spraying atomized water onto said bar.

26. The apparatus of claim 25 wherein said means for spraying atomized water comprises in combination;
(a) means for filtering said used cooling water to remove contaminants therefrom;
(b) means for drawing said used cooling water to a venturi atomizer by flouring filtered air through said atomizer; and
(c) means for propelling atomized droplets of water and air onto the soot bearing surface of said bar in quantities sufficient to remove all soot therefrom without significantly lowering the temperature of the cast bar.

* * * * *